(12) United States Patent  (10) Patent No.: US 9,058,541 B2
Dubout et al.  (45) Date of Patent: Jun. 16, 2015

(54) OBJECT DETECTION METHOD, OBJECT DETECTOR AND OBJECT DETECTION COMPUTER PROGRAM

(71) Applicant: Fondation de l'Institut de Recherche Idiap, Martigny (CH)

(72) Inventors: Charles Dubout, Renens (CH); Francois Fleuret, Yverdon-les-Bains (CH)

(73) Assignee: Fondation De L'Institut De Recherche IDIAP (CH)

( * ) Notice: Subject to any disclaimer, the term of this patent is extended or adjusted under 35 U.S.C. 154(b) by 347 days.

(21) Appl. No.: 13/624,375

(22) Filed: Sep. 21, 2012

(65) Prior Publication Data

US 2014/0089365 A1  Mar. 27, 2014

(51) Int. Cl.
*G06F 15/00* (2006.01)
*G06K 9/52* (2006.01)
*G06F 17/14* (2006.01)

(52) U.S. Cl.
CPC .............. *G06K 9/522* (2013.01); *G06F 17/142* (2013.01)

(58) Field of Classification Search
CPC ..... G06F 17/142; G06F 17/141; G06F 17/14; G06T 1/0071; H04H 20/31
USPC ........................................................ 708/403
See application file for complete search history.

(56) References Cited

U.S. PATENT DOCUMENTS

| 5,933,546 | A | 8/1999 | Stone |
| 6,498,863 | B1 | 12/2002 | Gaidoukevitch et al. |
| 7,099,510 | B2 | 8/2006 | Jones et al. |
| 7,502,312 | B2 * | 3/2009 | Zhang et al. .................. 370/210 |
| 2004/0088272 | A1 | 5/2004 | Jojic et al. |
| 2006/0110072 | A1 | 5/2006 | Domera-Venkata |
| 2006/0188146 | A1 | 8/2006 | Behiels |
| 2006/0215880 | A1 | 9/2006 | Berthilsson et al. |
| 2009/0016571 | A1 | 1/2009 | Tijerina et al. |
| 2010/0293214 | A1 | 11/2010 | Longley |

(Continued)

FOREIGN PATENT DOCUMENTS

| WO | WO-2005003805 A1 | 1/2005 |
| WO | WO-2005059834 A1 | 6/2005 |
| WO | WO-2011157280 A1 | 12/2011 |

OTHER PUBLICATIONS

P. Felzenszwalb et al., "A Discriminatively Trained, Multiscale, Deformable Part Model," Proceedings of the IEEE CVPR 2008, pp. 1-8.

(Continued)

*Primary Examiner* — Tan V. Mai
(74) *Attorney, Agent, or Firm* — Blank Rome LLP

(57) ABSTRACT

Object detection receives an input image to detect an object of interest. It determines feature matrices based on the received image, wherein each matrix represents a feature of the received image. The plurality of matrices are Fourier transformed to Fourier feature matrices. Fourier filter matrices are provided, each representing a feature of an object transformed in Fourier space. Each filter matrix is point-wise multiplied with one of the feature matrices corresponding to the same feature. The plurality of matrices are summed, resulting by point-wise multiplying each Fourier filter matrix with the corresponding Fourier feature matrix to obtain a Fourier score matrix. An inverse Fourier transform of the Fourier score matrix is performed, resulting in a score matrix, which is used to detect the object in the input image.

19 Claims, 2 Drawing Sheets

(56) References Cited

U.S. PATENT DOCUMENTS

| | | |
|---|---|---|
| 2011/0050918 A1 | 3/2011 | Tachi |
| 2011/0116687 A1 | 5/2011 | McDonald et al. |
| 2012/0081385 A1 | 4/2012 | Cote et al. |
| 2012/0133801 A1 | 5/2012 | Sekine |

OTHER PUBLICATIONS

R. Girshick et al., "LSVM-MDPM Release 4 Notes," Apr. 21, 2010, pp. 1-4. http://www.cs.brown.edu/~pff/latent-release4/release4-notes.pdf.

P. Felzenszwalb et al., "Object Detection Grammars," University of Chicago, Computer Science TR-2010-02, Feb. 2010, pp. 1-15.

H. Cecotti et al. "Convolutional Neural Network with Embedded Fourier Transform for EEG Classification," International Conference on Pattern Recognition, 2008, pp. 1-4.

B. Chazelle, "The Bottom-Left Bin-Packing Heuristic: An Efficient implementation," IEEE Transactions on Computers, 1983, pp. 697-707.

N. Dalal et al., "Histograms of Oriented Gradients for Human Detection," IEEE Conference on Computer Vision and Pattern Recognition, 2005, pp. 1-8.

P. Dollar et al., "The Fastest Pedestrian Detector in the West," British Machine Vision Conference, 2010, pp. 1-11.

M. Everingham et al., "Visual Object Classes Challenge 2007 (VOC2007)," PASCAL, 2 pages http://www.pascalnetwork.org/challenges/VOC/voc2007/workshop/index.html.

M. Everingham et al., "Visual Object Classes Challenge 2011 (VOC2011)," PASCAL, 5 pages http://www.pascalnetwork.org/challenges/VOC/voc2011/workshop/index.html.

P. Felzenszwalb et al., "Pictorial Structures for Object Recognition," International Journal of Computer Vision, 2005, pp. 1-42.

P. F. Felzenszwalb et al., "Discriminatively Trained Deformable Part Models," Version 4, Apr. 21, 2010, 3 pages http://people.cs.uchicago.edu/pff/latent-release4/.

P. F. Felzenszwalb et al., "Cascade Object Detection with Deformable Part Models," IEEE Conference on Computer Vision and Pattern Recognition, 2010, pp. 1-8.

P. F. Felzenszwalb et al., "Object Detection with Discriminatively Trained Part-Based Models," IEEE Transactions on Pattern Analysis and Machine Intelligence, 2010, pp. 1-20.

P. F. Felzenszwalb et al., "Distance Transforms of Sampled Functions," Technical report, Cornell Computing and Information Science, 2004, pp. 1-15.

M. Frigo et al., "The Design and Implementation of FFTW3," Proceedings of the IEEE, vol. 93, No. 2, 2005, pp. 1-16.

G. Guennebaud et al., Eigen is a C++ Template Library for Linear Algebra: Matrices, Vectors, Numerical Solvers, and Related Algorithms, 8 pages http://eigen.tuxfamily.org, 2010.

C. H. Lampert et al., "Beyond Sliding Windows: Object Localization by Efficient Subwindow Search,".IEEE Conference on Computer Vision and Pattern Recognition, 2008, pp. 1-8.

S. Maji et al., "Object Detection using a Max-Margin Hough Transform," IEEE Conference on Computer Vision and Pattern Recognition, 2009, pp. 1-8, 2009.

R. Perko et al., "Context Driven Focus of Attention for Object Detection," Attention in Cognitive Systems, Theories and Systems from an Interdisciplinary Viewpoint (WAPCV 2007), vol. 4840, chapter 14, Springer LNAI, 2007, pp. 216-233.

P. Viola et al., "Robust Real-time Object Detection," International Journal of Computer Vision, 2001, pp. 1-25.

C. Zhang et al., "Multiple-Instance Pruning for Learning Efficient Cascade Detectors," Conference on Neural Information Processing Systems, 2007, pp. 1-8.

* cited by examiner

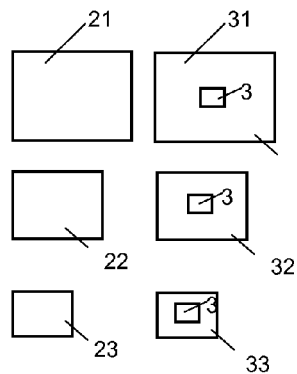 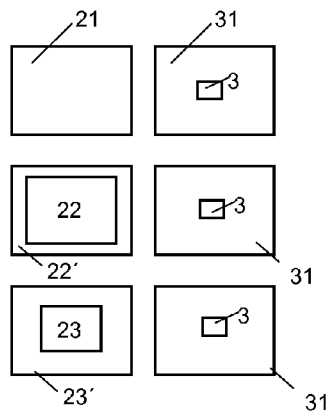 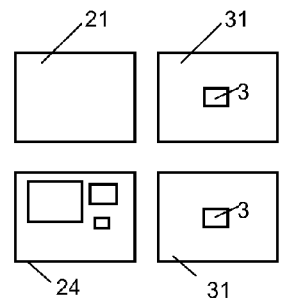
Fig. 4A  Fig. 4B  Fig. 4C
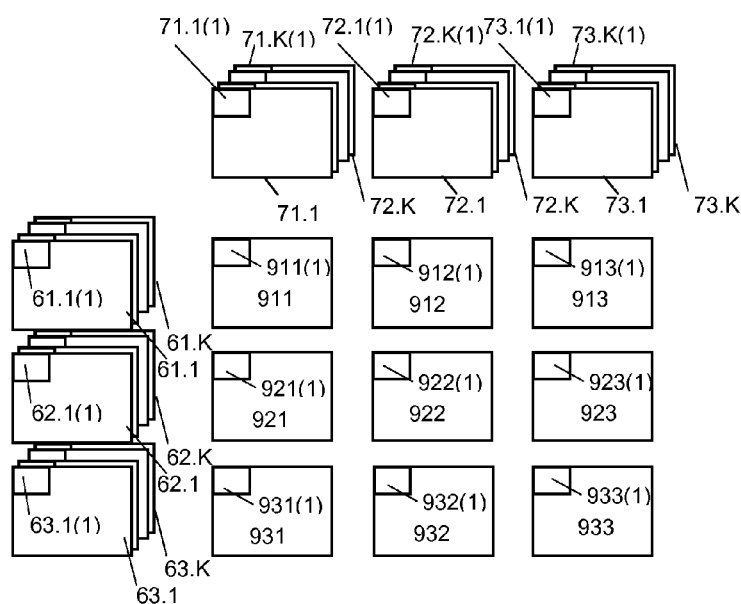
Fig. 5

OBJECT DETECTION METHOD, OBJECT DETECTOR AND OBJECT DETECTION COMPUTER PROGRAM

FIELD OF THE INVENTION

The present invention concerns an object detection method, an object detector and an object detection computer program, more specifically a linear object detection method.

DESCRIPTION OF RELATED ART

A common technique for object detection is to apply a binary classifier at every possible position and scale of an image in a sliding-window fashion. However, searching the entire search space, even with a simple detector can be slow, especially if a large number of image features are used.

To that end, linear classifiers have gained a huge popularity in the last few years. Their simplicity allows for very large scale training and relatively fast testing, as they can be implemented in terms of convolutions. They can also reach state-of-the-art performance provided one use discriminant enough features. Indeed, such systems have constantly ranked atop of the Pascal Visual Object Classes Challenge. Part-based deformable models are the latest incarnations of such systems, and current winners of the challenge as published in the IEEE Conference Transactions on Pattern Analysis and Machine Intelligence 32(9): 1627-1645, 2010, "Object Detection with Discriminatively Trained Part-Based Models" by P. F. Felzenszwalb, R. B. Girshick, D. Mc Allester and D. Ramanan.

The U.S. Pat. No. 7,099,510 discloses another popular object detection method.

Those part-based deformable models can use thousands of linear filters in order to detect the object(s) of interest. The different filters detect the object viewed from different viewpoints, and might detect either the whole object or some part of it. Even if the convolution of the feature matrices extracted from the image in which the object shall be detected with the respective linear filters can be computed relatively fast, this step becomes the bottleneck of the detection due to the high number of linear filters.

There are some known methods which accelerate the above-described method of object detection such as cascades. However, all those methods increase the error of the object detection method and require the tuning of parameters.

Therefore, it is an object of the invention to overcome the disadvantages of the state of the art and to decrease the computational time of linear object detection methods while maintaining the exactness of linear filtering.

BRIEF SUMMARY OF THE INVENTION

According to the invention, these aims are achieved by means of the object detection method according to claim 1. This object detection method comprises the following steps. An input image in which to detect an object is received. A plurality of feature matrices is determined on the basis of the received input image, wherein each feature matrix represents a feature of the received input image. A Fourier transform of the plurality of feature matrices is performed which yields a plurality of Fourier feature matrices, i.e. each feature matrix is Fourier transformed to a corresponding Fourier feature matrix such that the number of feature matrices correspond to the number of Fourier feature matrices. A plurality of Fourier filter matrices is provided, wherein each Fourier filter matrix represents the object in the Fourier space. Each Fourier filter matrix is point-wise multiplied with one of the Fourier feature matrices corresponding to the same feature. The plurality of matrices resulting by point-wise multiplying each Fourier filter matrix with the corresponding Fourier feature matrix is summed up to a Fourier score matrix. The Fourier score matrix is then transformed back by an inverse Fourier transform to a score matrix. The score matrix is used in order to detect the object in the received input image.

The object is further solved by the object detector according to the claims. Object detector comprising an interface, a feature calculator, a Fourier transformer, a Fourier filter provider, a multiplier, an adder, an inverse Fourier transformer and a detector. The interface is configured for receiving an input image in which to detect an object. The feature calculator is configured to compute a plurality of feature matrices on the basis of the received input image, wherein each feature matrix contains a feature of the received input image. The Fourier transformer is configured for transforming the plurality of feature matrices to a plurality of Fourier feature matrices. The Fourier filter provider is configured for providing a plurality of Fourier filter matrices, wherein each Fourier filter matrix contains a feature of an object in the Fourier space. The multiplier is configured to point-wise multiplying each Fourier filter matrix with one of the plurality of Fourier feature matrices corresponding to the same feature. The adder is configured to sum up the plurality of matrices resulting from point-wise multiplying each Fourier filter matrix with the corresponding Fourier feature matrix to get a Fourier score matrix. The Inverse Fourier transformer is configured to perform an inverse Fourier transform of the Fourier score matrix resulting in a score matrix. The detector is configured for detecting said object in the input image on the basis of the score matrix.

The object is further solved by the object detection computer program the claimed invention. The object detection computer program comprises instructions configured to perform the steps of the above-describe object detection method.

By performing the convolution in the Fourier space as point wise multiplication and adding the result up in the Fourier space, the computation time of the object detection method is not anymore restricted by the computation time of the convolution for the plurality of filter matrices with the plurality of feature matrices, but by the computation time of the Fourier transform of the plurality of feature matrices. Since the Fourier transform can be computed very efficiently and by exploiting further advantages of this method, demanding the object detection problems can be computed 10 times as fast as by performing the convolution in the position space. In addition, the error remains the same, since the computation of the convolution in the frequency space as point-wise multiplication is mathematically equivalent. By performing the summation of the Fourier score matrices in the Fourier space before applying the inverse Fourier transform, only one inverse Fourier transform instead of K inverse Fourier transforms has to be performed. Therefore, the total number of (inverse) Fourier transforms is K+1 instead of 2K, wherein K is the number of feature matrices. Thus, the performance is increased by a factor of 2. In the case that L object views/object parts/object forms are used as basis for LK Fourier filter matrices, K forward Fourier transforms and LK inverse Fourier transforms would have been performed if the summation is done in the position space. By performing the summation in the Fourier space, only K Fourier transforms and L inverse Fourier transforms have to be transformed. For a large number L, this a dramatic acceleration.

The dependent claims refer to further embodiments of the invention.

In one embodiment, the step of providing the plurality of Fourier filter matrices comprises the further steps of receiving a plurality of filter matrices corresponding each to one feature of the object and transforming the plurality of filter matrices in the Fourier space to said plurality of Fourier filter matrices. In one embodiment, said plurality of filter matrices are padded to a predefined size before being transformed in the Fourier space. The padding process may comprise the steps of arranging the filter matrix in a certain position and possibly in a reverse order of a matrix of the necessary size and filling up the remaining elements with zeros or some other padding value. This has the advantage that the Fourier filter matrix has a predefined size, which corresponds to the size of the plurality of Fourier feature matrices. Therefore, Fourier feature matrices can be point-wise multiplied with the Fourier filter matrices with minimum amount of padding.

In one embodiment, the plurality of Fourier filter matrices are stored in a memory and are used for each input image received in which the object has to be detected. This has the advantage that the computation of the Fourier filter matrices does not contribute to the computation time of the detection process. This reduces further the computation time.

In one embodiment, the Fourier filter matrices have all a predefined size and the object detection method comprises the additional steps of computing at least two scaled feature matrices in at least two different sizes from the input image for each feature; combining the at least two scaled feature matrices within a combined feature matrix having the predefined size; and Fourier transforming the plurality of combined feature matrices to the plurality of Fourier feature matrices. In order to detect objects at different sizes, the input image is rescaled to different sizes. While in the state of the art, the convolution with all of the plurality of filters has to be performed for each rescaled plurality of Fourier feature matrices, in this embodiment, different scales of the feature matrix are combined within one combined feature matrix and transformed in the Fourier space. Therefore, a large number of different input image scales can be performed within one "convolution in the Fourier space". Therefore, on the one hand side the Fourier filter matrices in the Fourier space can be stored only in one size and the combined Fourier feature matrices in the same size can contain Fourier feature matrices at several sizes. In one embodiment, the at least two scaled feature matrices are arranged within the combined feature matrix so as to be separated by a sufficient amount of padding in order not to modify the results of the convolutions.

In one embodiment, the Fourier feature matrix and the Fourier filter matrix each are divided in a number of corresponding subsets of their elements, wherein iteratively the following steps are performed for each subset: point-wise multiplying the subset of each Fourier feature matrix with the corresponding subset of the respective Fourier filter matrix corresponding to the same feature; summing up the subsets of the plurality of matrices resulting by point-wise multiplying the subset of each Fourier feature matrix with the corresponding subset of the respective Fourier filter matrix. This embodiment allows to define subsets at sizes where all elements necessary to point-wise multiply and sum one subset can be loaded in the central processing unit (CPU) cache. Therefore, the computational time is further decreased as each subset has to be loaded from memory only once, and be retrieved as many times as necessary from the much faster CPU cache.

BRIEF DESCRIPTION OF THE DRAWINGS

The invention will be better understood with the aid of the description of an embodiment given by way of example and illustrated by the figures, in which:

FIGS. 4A, B and C show different methods for performing object detection with rescaled input images; and FIG. 5 shows one embodiment for further accelerating the object detection method according to the invention.

DETAILED DESCRIPTION OF POSSIBLE EMBODIMENTS OF THE INVENTION

Figure 1:
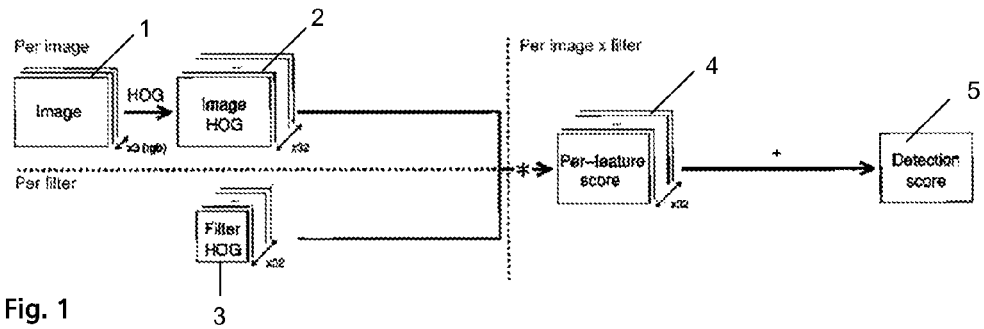
FIG. 1 shows a schematic illustration of the method of the state of the art.

FIG. 1 shows the method of object detection of the state of the art. An input image 1 is received for detecting an object in the input image 1. The input image 1 normally comprises three colour pixel levels as shown in FIG. 1. The input image 1 is divided into grid cells. A plurality of features is calculated for each grid cell such that a plurality of feature matrices 2 is retrieved. Each feature matrix 2 corresponds to one feature and each element of this feature matrix 2 to the intensity of this feature in the grid cell corresponding to the matrix element. For example, the Histogram of Oriented Gradients (HOG) corresponds to the bins of a histogram of the gradient orientations of the pixels within one grid cell. In this example, each feature matrix represents the intensity of one orientation of gradients of the input image. Typically cells of size 8×8 pixels are used while the number of features per cell vary from around ten until a hundred. In FIG. 1 thirty-two orientations of the gradients are used as thirty-two features.

The object detection method according to the state of the art uses then a plurality of filter matrices 3 representing each one feature of the object to be detected. In the example shown in FIG. 1, there are thirty-two filter matrices 3, wherein each filter matrix 3 corresponds to one of the thirty-two orientations of gradients of the object to be detected. A convolution is computed between the filter matrix 3 of the first feature and the feature matrix 2 of the first feature. The same is performed iteratively for the second feature up to the last feature which yields a plurality of per-feature score matrices 4. In FIG. 1, there are thirty-two per-feature score matrices 4. The plurality of per-feature score matrices 4 are summed up to one score matrix 5. The detection of the most likely position of the object in the grid cells is determined on the basis of the score matrix 5. For example the grid position with the maximum score could be the position of the detected object. In another example, an object is detected in a grid cell with a score above a certain threshold. Consequently also more than one object can be detected.

Figure 2:
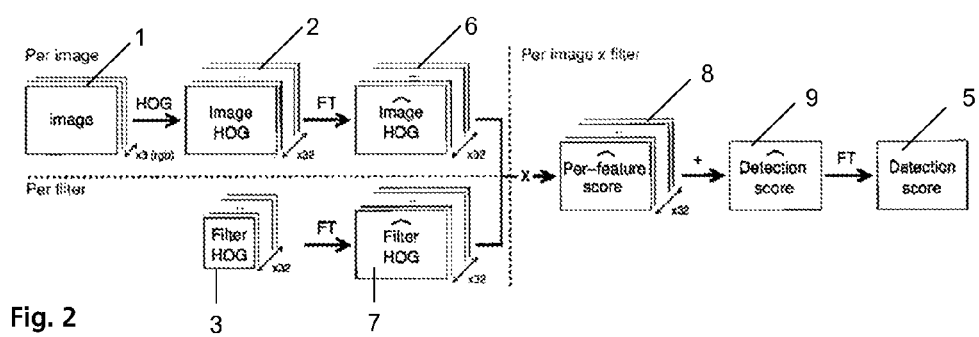
FIG. 2 shows a schematic illustration of one embodiment of the object detection method according to the invention.

FIG. 2 shows now one embodiment of the object detection method according to the invention.

An input image 1 is received for detecting an object. The input image 1 normally comprises three colour pixel levels. The input image 1, i.e. each of the three colour levels, is divided into grid cells. A plurality of features is calculated for each grid cell such that a plurality of feature matrices 2 is retrieved. Each feature matrix 2 corresponds to one feature and each element of this feature matrix 2 to the intensity of this feature in the grid cell corresponding to the matrix element. For example, the Histogram of Oriented Gradients (HOG) corresponds to the bins of a histogram of the gradient orientations within one grid cell. In this example, each feature matrix represents the intensity of one orientation of gradients of the input image. Typically cells of size 8×8 pixels are used. However, the invention is not restricted to this grid cell size. In the described embodiment, the grid cell size is the same for each feature. The number of features is normally from around ten until a hundred. However, the invention is not restricted to this number and also less or more features can be used. In FIG. 2, thirty-two orientations of the gradients are used as thirty-two features. However the invention is not restricted to calculating the feature matrix 2 with the help of a grid cell. E.g. the input image 1 or one of the colour levels of the input image 1 could be as well used as feature matrix 2, if the input image 1 is padded to the size of the feature matrix 2 or if the size of the input image 1 is used as size of the feature matrix 2, e.g. grid size is equal to one pixel.

In the embodiment of the object detection method according to the invention, a plurality of filter matrices 3 represents each one feature of an object to be detected. In the example shown in FIG. 2, there are thirty-two filter matrices 3, wherein each filter matrix 3 corresponds to one of the thirty-two orientations of gradients of the object to be detected. This means that there exists for each feature matrix 2 exactly one filter matrix 3 representing the same feature.

Instead of performing now the convolution between each of the feature matrices 2 with the corresponding filter matrix 3, each feature matrix 2 is transformed by a Fourier transform in the Fourier space which yields a plurality of Fourier feature matrices 6. Also the filter matrix 3 is transformed by a Fourier transform in the Fourier space which yields a plurality of Fourier filter matrices 7. In the present embodiment, the size of the feature matrices 2 and consequently also of the Fourier feature matrices 3 have the size M×N. Since the filter matrices 3 have a smaller size P×Q, the filter matrices 3 have to be padded to the size of the Fourier feature matrices 3. This is performed by moving at a certain position and possibly in a reverse order each filter matrix 3 in a matrix having the same size as the feature matrix 2 corresponding to the same feature as the filter matrix 3 and filling the remaining elements with zeros or other padding values. Since preferably the filter result of the feature matrix 2 with the filter matrix 3 is desired, the filter matrix 3 is reversed such that the element W'(i,j) of the filter matrix in reverse order is obtained by the element W(P-i,Q-j) of the filter matrix 3. That means that each filter matrix 3 is inverted left/right and up/down before being placed in the padded filter matrix. These padded filter matrices are then transformed in the Fourier space such that each Fourier filter matrix 7 has the same size as the Fourier feature matrix 6 corresponding to the same feature as the Fourier filter matrix 7. Preferably but without any restriction to the invention, the Fourier transform is performed by a Fast Fourier Transform (FFT) algorithm. The term Fourier transform in the sense of the invention includes also all equivalent transformations such as Cosinus or Sinus Transform, continuous or discrete Fourier, Cosinus or Sinus transform and further variations of the Fourier transform.

Then each Fourier filter matrix 7 is point-wise multiplied with one of the Fourier feature matrices 6 which corresponds to the same feature as represented by the Fourier filter matrix 7. In the present embodiment, each Fourier feature matrix 6 is point-wise multiplied with exactly one corresponding Fourier filter matrix 7 such that the thirty-two Fourier feature matrices 6 point-wise multiplied with the thirty-two Fourier filter matrices 7 yield in thirty-two (the same number as Fourier feature matrices 6 and Fourier filter matrices 7) of per-feature Fourier score matrices 8. The point-wise multiplication is defined by the following: The element in the i-th row and the j-th column of the matrix resulting by point-wise multiplying a first matrix and a second matrix is determined by multiplication of the element in the i-th row and the j-th column of the first matrix with the element in the i-th row and the j-th column of the second matrix. Since the output of the Fourier transform is normally complex, the multiplication is normally a complex multiplication. Since the input images 1, the feature matrices 2 and the filter matrices 3 contain only real numbers, the Fourier feature matrices 6 and the Fourier filter matrices 7 are symmetric. Therefore, it is possible to perform the point-wise multiplication by point-wise multiplying the non-redundant parts of the Fourier feature matrices 6 and of the Fourier filter matrices 7 yielding a non-redundant part of the per-feature Fourier matrix 8. The redundant part of the per-feature Fourier matrix 8 can be determined on the basis of the non-redundant part of the per-filter Fourier matrices 8. This accelerates further the procedure.

In the present embodiment, the plurality of per-feature Fourier score matrices 8 are summed-up to one Fourier score matrix 9. In the present embodiment, each per-feature Fourier score matrix 8 has the same size such that the addition step does not necessitate any rescaling of the per-feature Fourier score matrices 8.

An inverse Fourier transform is applied to the computed Fourier score matrix 9 which yields a score matrix 5. Since the convolution of the plurality of filter matrices 3 with the plurality of feature matrices 2 corresponds to the point-wise multiplication of the Fourier filter matrices 7 with the corresponding Fourier feature matrices 6 in the Fourier space, the score matrix 5 in FIG. 2 corresponds to the score matrix 5 in FIG. 1 retrieved by the method of the state of the art. Therefore, the method of the state of the art for determining the score matrix 5 is accelerated without increasing the estimation error of the method. Finally, the score matrix 5 is used to detect the position of the object or, in case the object is contained several times in the input image 1, the objects in the input image 1. The object detection can be further improved by repeating the described steps for different filters containing features of other forms and/or sights of the object. The object detection can be further improved by repeating the described steps for the received input image 1 rescaled to another sized. Therefore, the same object can be detected at a different size.

Figure 3:
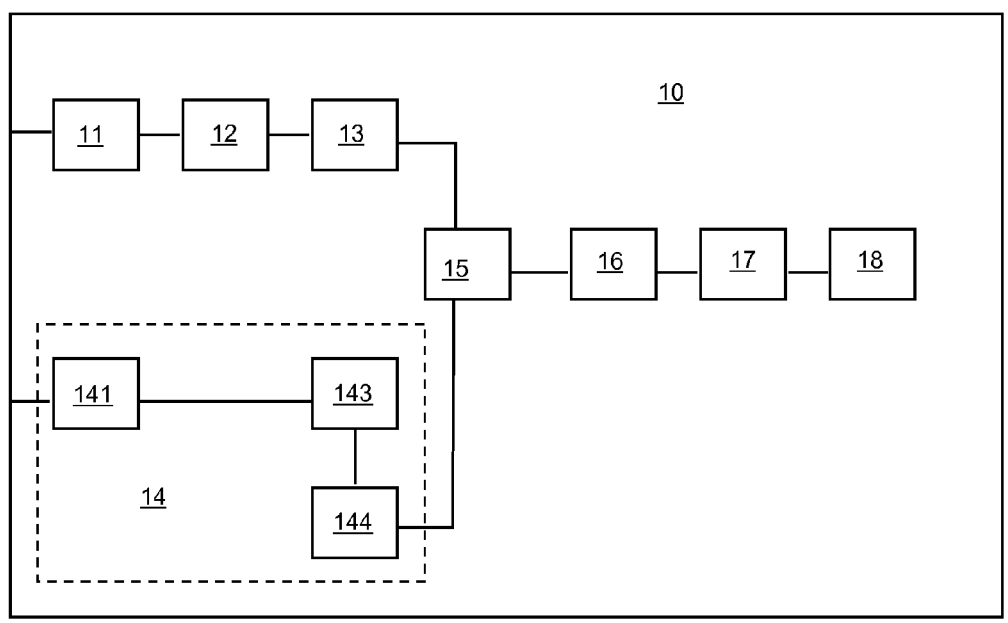
FIG. 3 shows a schematic illustration of one embodiment of the object detector according to the invention.

FIG. 3 shows an embodiment 10 of the object detector according to the invention. The object detector 10 comprises an interface 11, a feature calculator 12, a Fourier transformer 13, a Fourier filter provider 14, a multiplier 15, an adder 16, an inverse Fourier transformer 17 and a position detector 18.

The interface 11 is configured to receive input images 1. Each input image 1 received is transferred to the feature calculator 12. The feature calculator 12 is configured to calculate for each input image 1 received a plurality of feature matrices 2 as described above and to transfer this plurality of calculated feature matrices 2 to the Fourier transformer 13. The Fourier transformer 13 is configured to perform a Fourier transform on incoming matrices and transfer the resulting matrices to the multiplier 15. The Fourier transformer 13 in particular is configured to perform a Fourier transform on each of the plurality of feature matrices 2 and transfer the resulting plurality of Fourier feature matrices 6 to the multiplier 15.

The Fourier filter provider 14 is configured to provide the plurality of Fourier filter matrices 7 mentioned above and to transfer the plurality of Fourier filter matrices 7 to the multiplier 15. The Fourier filter provider 14 in the present embodiment comprises a further interface 141, a further Fourier transformer 143 and a memory 144. In the present invention, the functions of the further interface 141 and of the further Fourier transformer 143 of the Fourier filter provider correspond to the interface 11 and the Fourier transformer 13 of the object detector 10. The further interface 141 receives the plurality of filter matrices 3 corresponding each to one feature of the object. The further Fourier transformer 143 is further configured to pad each filter matrix 3 to the size of the feature matrix 2 or Fourier feature matrix 6 corresponding to the same feature as the filter matrix 3. In the present embodiment, but without any restriction of the invention, this is always the same size for all filter matrices 3. The further Fourier transformer 143 is configured to Fourier transform the plurality of padded filter matrices in the Fourier space yielding a plurality of Fourier filter matrices 7. The plurality of Fourier filter matrices 7 is stored in the memory 144. The memory 144 gives each time, when the plurality of Fourier feature matrices 6 is transferred to the multiplier 15 and when the object is searched, the plurality of Fourier filter matrices 7 from the memory 144 to the multiplier 15. Consequently, the Fourier filter matrices 7 are computed only once offline and stored in the memory 144 for use with every input image 1 received at interface 11 for detecting said object. In another embodiment, the Fourier filter provider 14 may only comprise a memory 144 without the possibility of adding further Fourier filter matrices. In a further embodiment, the Fourier filter provider 14 may comprise only the further interface 141 and the memory 144 such that the memory 144 may receive via the interface 141 directly different Fourier filter matrices 7 without the possibility of computing the Fourier filter matrices 7 directly in the Fourier filter provider 14 from filter matrices 3 received.

The multiplier 15 is configured to point-wise multiply each of the plurality of Fourier filter matrices 7 received from the Fourier filter provider 14 with the corresponding Fourier feature matrix 6 received from the Fourier transformer 13. The multiplier 15 relates each Fourier filter matrix 7 of the plurality of Fourier filter matrices 7 to one of the plurality of Fourier feature matrices 6 for point-wise multiplying each Fourier filter matrix 7 with the correct Fourier feature matrix 6. In the present embodiment, the Fourier feature matrices 6 may be numbered from 1 to K and the Fourier filter matrices 7 may be numbered from 1 to K, wherein K is the number of features. Then the multiplier can point-wise multiply the i-th Fourier feature matrix 6 with the i-th Fourier filter matrix 7 resulting in the per-feature Fourier score matrix 8 relating to the i-th feature for all i=1, . . . , K.

The adder 16 is configured to sum up the K per-feature Fourier score matrices 8 to one Fourier score matrix 9 and to transfer the Fourier score matrix 9 to the inverse Fourier transformer 17. The inverse Fourier transformer 17 performs an inverse Fourier transform of the Fourier score matrix 9 in order to transform the Fourier score matrix 9 back in the position space. The resulting score matrix 5 is transferred to the position detector 18. The position detector 18 is configured to detect the position of the object or the objects in the input image 1 on the basis of the score matrix 5. If the object detector 10 receives a series of input images 1 and gives out the series of positions of the object/objects in these input images, the object detector can also be used as object tracker. The position detector 18 could combine the score matrices 9 received by different filter matrices 3 and/or by different scales of the input image 1 to improve the detection result.

The object represented by the Fourier filter matrices 7 in the embodiment shown in FIGS. 2 and 3 is only detected in the input image 1, if the object appears in the input image 1 in the exact same size as represented in the Fourier filter matrices 7. Therefore, the object detection method described before is normally repeated for the same input image 1 at different scales.

FIGS. 4A, 4B and 4C show three embodiments of performing the object detection at different input image scales.

In the embodiment shown in FIG. 4A, the input image 1 is scaled to a plurality of rescaled input images 21, 22 and 23. Rescaled input images 21, 22, 23 are at least two rescaled input images wherein at least one of them is rescaled compared to the input image 1 received, i.e. one of the rescaled input images can still have the size of the input image received at the interface 11. However, each rescaled input image has a different size compared to the other rescaled input images. For each of those rescaled input images 21, 22 and 23, the plurality of feature matrices 2 are calculated and Fourier transformed to the Fourier feature matrices 6. In order to point-wise multiply the Fourier feature matrices 6 for each scale with the Fourier filter matrices 7, the memory 144 should contain the Fourier filter matrices 7 at each possible scaling size. Therefore, the Fourier filter matrices 7 corresponding to filter matrices 3 padded to each of the used scaling sizes are stored in the memory 144. Otherwise, the Fourier transform of the padded filter matrices 31, 32 and 33 have to be computed online for each rescaled input image 21, 22 and 23. Therefore, this embodiment has the disadvantage that the computational time is increased or a large amount of memory 144 is necessary. In the embodiment shown in FIG. 4B, the plurality of Fourier filter matrices 31 have the size of the feature matrix 2 corresponding to the largest rescaled feature matrix 2 corresponding to the rescaled input images 21, 22, 23. The plurality of Fourier filter matrices 31 is stored in the memory 144 only in this size. Consequently, the rescaled input images 22 and 23 not corresponding to the maximum size are padded to the size of the largest rescaled input image 21 such as padded rescaled input images 22' and 23' comprising the rescaled input image 22 and 23 respectively. However, this solution increases the computation time, since even for smaller rescaled input images 22 and 23, the Fourier transform has to be performed for the larger size of the padded rescaled input images 22' and 23'.

The embodiment shown in FIG. 4C combines the advantages of both methods. The plurality of Fourier filter matrices 31 are stored only at one size in the memory 144, which corresponds to the maximum size of the rescaled feature matrices 3 of the rescaled input image 21 or an even bigger size. Therefore, in a first step the object is detected in the largest rescaled input image 21. The remaining smaller rescaled input images 22, 23, etc. are arranged as a patchwork in at least one patchwork image 24 having the same size as the image 21, 22, 23. Therefore, instead of Fourier transforming the white spaces as shown in FIG. 4B, the white spaces of the patchwork image 24 is filled with further rescaled images. Therefore, with one object detection loop shown in FIG. 2 but using a patchwork image 24 as input image 1, the detection of several rescaled input images 21, 22 and 23 can be performed in one object detection loop. Arranging images as a patchwork in a patchwork image in the sense of this invention means that images are arranged in a non-overlapping manner in the patchwork image. Not necessarily but preferably the images in the patchwork image have a distance between them such that the object corresponding to the filter matrix would not overlap two images in one position of the filter matrix in the patchwork image 24. The patchwork image 24 in one object detection loop is used as an input image 1 in FIG. 2. Instead of rescaling the input image 1, also the plurality of feature matrices 2 can be rescaled to different sizes and arranged in a patchwork feature matrix comprising the different rescaled feature matrices relating to one feature.

Since the object cannot only have different sizes but also different forms and different side views, normally a plurality of object views, object parts and/or object forms are used for object detection. Therefore, the described process of detecting an object within an input image is repeated for different object views, object parts and/or object forms. Each object view, object part and/or object form build the basis for the plurality of filter matrices 3 and Fourier filter matrices 7 in one loop comprising point-wise multiplying the K Fourier feature matrices 6 with the corresponding K Fourier filter matrices 7, summing up the K per-feature Fourier score matrices 8 and inverse Fourier transforming the Fourier score matrix 9. The loop of point-wise multiplying the K Fourier feature matrices 6 with the corresponding K Fourier filter matrices 7, summing up the K per-feature Fourier score matrices 8 and inverse Fourier transforming the Fourier score matrix 9 in FIG. 2 is performed for each object view, object part and/or object form yielding for each object view, object part and/or object form in a score matrix 5, wherein each object view, object part and/or object form corresponds to K filter matrices 3.

FIG. 5 shows such an embodiment with a number of Fourier filter matrices 7 corresponding to different object views and a number of patchwork matrices. The K Fourier feature matrices 61.1 to 61.K refer to the K features of a first patchwork image as input image 1. The K Fourier feature matrices 62.1 to 62.K refer to the K features of a second patchwork image as input image 1. The K Fourier feature matrices 63.1 to 63.K refer to the K features of a third patch work image as input image 1. It is clear that this embodiment is not restricted to three patchwork images, but any number R of patchwork images can be used as input images. Instead of patchwork images also normal input images comprising only one rescaled input image 21, 22, 23, 22", 23" as shown in FIGS. 4A and 4B can be used. The K Fourier filter matrices 71.1 to 71.K refer to the K features of a first object view. The K Fourier filter matrices 72.1 to 72.K refer to the K features of a second object view. The K Fourier filter matrices 73.1 to 73.K refer to the K features of a third object view. The Fourier score matrix 911 results from point-wise multiplying the K Fourier feature matrices 61.1 to 61.K with the K Fourier filter matrices 71.1 to 71.K and summing the resulting per-feature Fourier score matrices up. The Fourier score matrix 912 results from point-wise multiplying the K Fourier feature matrices 61.1 to 61.K with the K Fourier filter matrices 72.1 to 72.K and summing the resulting per-feature Fourier score matrices up. The Fourier score matrix 921 results from point-wise multiplying the K Fourier feature matrices 62.1 to 62.K with the K Fourier filter matrices 71.1 to 71.K and summing the resulting per-feature Fourier score matrices up. The Fourier score matrices 913, 922, 923, 931, 932 and 933 are computed accordingly.

Already for computing the Fourier score matrix 911, all K Fourier feature matrices 61.1 to 61.K and the K Fourier filter matrices 71.1 to 71.K have to be read in the CPU Cache. For computing the Fourier score matrices 912 and 913 also all K Fourier feature matrices 61.1 to 61.K have to be read-in again or maintained in the CPU Cache. Since the CPU Cache might not be big enough, the slower external memory has to be used with the corresponding slow read and write operations. However, the present invention allows to seriously accelerate the point-wise multiplications and the following sum of the per-feature Fourier score matrices 8. Therefore, the K Fourier feature matrices 61.1 to 61.K and the K Fourier filter matrices 71.1 to 71.K are each divided in Fragments i=1 to S, wherein each fragment comprises a subset of elements of the corresponding matrices. Therefore, the reference 71.1(*i*) references the i-th fragment of the Fourier filter matrix 71.1. FIG. 5 shows without restriction of the invention only the first fragment i=1 of the plurality of fragments. Since the computation of one element (k,l) of the Fourier score matrix 911 by the point-wise multiplication and summation needs only the knowledge of this element (k,l) of the K Fourier feature matrices 61.1 to 61.K and the K Fourier filter matrices 71.1 to 71.K, the fragment 911(*i*) can be calculated by knowledge of the fragments 61.1(*i*) to 61.K(i) and 71.1(*i*) to 71.K(i) without reading in the remaining fragments j not equal to i. Therefore, in one embodiment the fragments 61.1(*i*) to 61.K(i) and 71.1(*i*) to 71.K(i) are read in the CPU Cache and the fragment 911(*i*) is computed before the other fragments 61.1(*j*) to 61.K(j) and 71.1(*j*) to 71.K(j) are read in and fragments 911(*j*) are computed, wherein j is not equal to i. In another embodiment, all fragments 61.1(*i*) to 61.K(i), 62.1(*i*) to 62.K(i), 63.1(*i*) to 63.K(i) and 71.1(*i*) to 71.K(i), 72.1(*i*) to 72.K(i), 73.1(*i*) to 73.K(i) of all Fourier filter matrices corresponding to all object views and of all patchwork matrices are read in and the fragments 911(*i*), 912(*i*), 913(*i*), 921(*i*), 922(*i*), 923(*i*), 931(*i*), 932(*i*), 933(*i*) of all Fourier score matrices 911, 912, 913, 921, 922, 923, 931, 932, 933 are computed before the other fragments j of the Fourier filter matrices and the Fourier feature matrices are considered. Even if the fragmentation was described in the context of multiple rescaled images in multiple patchwork images and of multiple object views, object parts and/or object forms, it is clear to a person skilled in the art that the described fragmentation has also an advantage in one single detection loop described in FIG. 2, wherein only one input image 1 with one scale or only one patchwork image is used for detecting the object relating to only one object view, object form and/or object part. It is also clear that the fragmentation has also an advantage, if only one input image 1 with one scale or only one patchwork image is used for detecting the object relating to a plurality of at least one of the object view, object form and/or object part. It is also clear that the fragmentation has also an advantage, if a plurality of input images 1 or a plurality of patchwork images is used for detecting the object relating to only one object view, object form and/or object part.

The present invention achieves a dramatic acceleration of state of the art object detection methods without deteriorating the quality of the object detection estimator.

The invention claimed is:

1. Object detection method comprising the steps of:
   receiving at an interface, an input image for detecting an object within the received input image;
   determining at a feature calculator, a plurality of feature matrices on the basis of the received input image, wherein each feature matrix represents a feature of the received input image;
   Fourier transforming at a Fourier transformer, the plurality of feature matrices to a plurality of Fourier feature matrices;
   providing at a Fourier filter, a plurality of Fourier filter matrices, wherein each Fourier filter matrix represents a feature of an object in the Fourier space;
   point-wise multiplying at a multiplier, each Fourier filter matrix with one of the plurality of Fourier feature matrices corresponding to the same feature;
   summing up at an adder, the plurality of matrices resulting by point-wise multiplying each Fourier filter matrix with the corresponding Fourier feature matrix resulting in a Fourier score matrix;
   performing at an inverse Fourier transformer, an inverse Fourier transform of the Fourier score matrix resulting in a score matrix;
   detecting at a detector, the object in the input image on the basis of the score matrix.

2. Object detection method according to claim 1, wherein the step of providing the plurality of Fourier filter matrices comprises the further steps of receiving a plurality of filter matrices representing features of the object to be detected and transforming the plurality of filter matrices in the Fourier space to said plurality of Fourier filter matrices.

3. Object detection method according to claim 2, wherein said plurality of filter matrices are padded to a predefined size before being transformed in the Fourier space.

4. Object detection method according to claim 3, wherein the plurality of feature matrices and/or the plurality of Fourier feature matrices have the predefined size.

5. Object detection method according to claim 1, wherein the plurality of Fourier filter matrices are stored in a memory and are used for each input image received in which the object has to be detected.

6. Object detection method according to claim 1, wherein the plurality of Fourier filter matrices have a predefined size and the object detection method comprises the further steps of:
computing at least two scaled feature matrices in at least two different sizes from the input image for each feature;
combining the at least two scaled feature matrices of each feature within a combined feature matrix having the predefined size; and
Fourier transforming the plurality of combined feature matrices to the plurality of Fourier feature matrices.

7. Object detection method according to claim 6, wherein the at least two scaled feature matrices are arranged within the combined feature matrix such that the at least two scaled feature matrices do not overlap.

8. Object detection method according to claim 1 comprising the further step of dividing the Fourier feature matrix and the Fourier filter matrix each in a number of corresponding subsets of their elements, wherein iteratively the following steps are performed for each subset:
point-wise multiplying the subset of each Fourier feature matrix with the corresponding subset of the respective Fourier filter matrix corresponding to the same feature as the Fourier feature matrix;
summing up subsets of the plurality matrices resulting by point-wise multiplying the subset of each Fourier feature matrix with the corresponding subset of the respective Fourier filter matrix.

9. Object detector comprising:
interface for receiving an input image for detecting an object within the received input image;
feature calculator for determining a plurality of feature matrices on the basis of the received input image, wherein each feature matrix represents a feature of the received input image;
Fourier transformer for transforming the plurality of feature matrices to a plurality of Fourier feature matrices;
Fourier filter provider for providing a plurality of Fourier filter matrices, wherein each Fourier filter matrix represents a feature of an object in the Fourier space;
multiplier for point-wise multiplying each Fourier filter matrix with one of the plurality of Fourier feature matrices corresponding to the same feature;
adder for summing up the plurality of matrices resulting by point-wise multiplying each Fourier filter matrix with the corresponding Fourier feature matrix to a Fourier score matrix;
Inverse Fourier transformer for performing an inverse Fourier transform of the Fourier score matrix resulting in a score matrix; and
detector for detecting said object in the input image on the basis of the score matrix.

10. Object detector according to claim 9, wherein the Fourier filter provider comprises a further interface for receiving a plurality of filter matrices representing each a feature of the object to be detected and a further Fourier transformer for transforming the plurality of filter matrices in the Fourier space to said plurality of Fourier filter matrices.

11. Object detector according to claim 10, wherein said further Fourier transformer is configured to pad said plurality of filter matrices to a predefined size before being transformed in the Fourier space.

12. Object detector according to claim 11, wherein the plurality of feature matrices and/or the plurality of Fourier feature matrices have the predefined size.

13. Object detector according to claim 9, wherein the Fourier filter provider comprises a memory comprising the plurality of Fourier filter matrices used for each input image received in which the object corresponding to the plurality of Fourier filter matrices has to be detected.

14. Object detector according to claim 9, wherein the plurality of Fourier filter matrices have a predefined size and the feature calculator is configured to:
compute at least two scaled feature matrices in at least two different sizes from the input image for each feature;
combine the at least two scaled feature matrices of each feature within a combined feature matrix having the predefined size; and
Fourier transform the plurality of combined feature matrices to the plurality of Fourier feature matrices.

15. Object detector according to claim 9, wherein the at least two scaled feature matrices are arranged within the combined feature matrix such that the at least two scaled feature matrices do not overlap.

16. Object detector according to claim 9, wherein the multiplier is configured to divide the Fourier feature matrix and the Fourier filter matrix each in a number of corresponding subsets of their elements and for each subset to point-wise multiply the subset of each Fourier feature matrix with the corresponding subset of the respective Fourier filter matrix corresponding to the same feature and to transfer the subsets of the resulting plurality matrices to the adder before processing another subset, and the adder is configured to sum up the received subsets of the plurality matrices resulting by point-wise multiplying the subset of each Fourier feature matrix with the corresponding subset of the respective Fourier filter matrix and transfer the resulting subset of the Fourier score matrix to the Inverse Fourier transformer before processing another subset.

17. Object detection computer program comprising instructions configured to perform the following steps if run on a processor:
receiving at an interface, an input image for detecting an object within the received input image;
determining at a feature calculator, a plurality of feature matrices on the basis of the received input image, wherein each feature matrix represents a feature of the received input image;
Fourier transforming at a Fourier transformer, the plurality of feature matrices to a plurality of Fourier feature matrices;
providing at a Fourier filter, a plurality of Fourier filter matrices, wherein each Fourier filter matrix represents a feature of an object in the Fourier space;
point-wise multiplying at a multiplier, each Fourier filter matrix with one of the plurality of Fourier feature matrices corresponding to the same feature;
summing up at an adder, the plurality of matrices resulting by point-wise multiplying each Fourier filter matrix with the corresponding Fourier feature matrix to a Fourier score matrix;

performing at an inverse Fourier transformer, an inverse Fourier transform of the Fourier score matrix resulting in a score matrix;

detecting at a detector, the object in the input image on the basis of the score matrix.

18. Object detection computer program according to claim 17, wherein the plurality of Fourier filter matrices have a predefined size and the object detection method comprises the further steps of:

computing at least two scaled feature matrices in at least two different sizes from the input image for each feature;

combining the at least two scaled feature matrices of each feature within a combined feature matrix having the predefined size; and Fourier transforming the plurality of combined feature matrices to the plurality of Fourier feature matrices.

19. Object detection computer program according to claim 17 comprising the additional step of dividing the Fourier feature matrix and the Fourier filter matrix each in a number of corresponding subsets of their elements, wherein iteratively the following steps are performed for each subset:

point-wise multiplying the subset of each Fourier feature matrix with the corresponding subset of the respective Fourier filter matrix corresponding to the same feature as the Fourier feature matrix;

summing up subsets of the plurality matrices resulting by point-wise multiplying the subset of each Fourier feature matrix with the corresponding subset of the respective Fourier filter matrix.

\* \* \* \* \*